United States Patent [19]

Horikoshi

[11] Patent Number: 5,474,723
[45] Date of Patent: Dec. 12, 1995

[54] METHOD OF FORMING A SHAPED ARTICLE OF RESIN USING CAVITY ENLARGEMENT TO INDUCE FOAMING

[76] Inventor: Maki Horikoshi, 27-16, Takaishi, 5-chome, Asao-ku, Kawasaki-shi, Kanagawa 215, Japan

[21] Appl. No.: 272,108

[22] Filed: Jul. 7, 1994

Related U.S. Application Data

[63] Continuation of Ser. No. 838,256, filed as PCT/JP90/01661, Dec. 20, 1990, abandoned.

[51] Int. Cl.⁶ .................... B29C 44/06; B29C 44/10
[52] U.S. Cl. .................... 264/45.5; 264/46.4; 264/53; 264/54; 264/255; 264/510
[58] Field of Search .................... 264/45.1, 328.7, 264/40.3, 53, 54, 255, 45.5, 510, 46.4

[56] References Cited

U.S. PATENT DOCUMENTS

| | | | |
|---|---|---|---|
| 3,719,441 | 3/1973 | Spaak et al. | 425/548 |
| 3,764,642 | 10/1973 | Boutillier | 428/318.8 |
| 3,793,415 | 2/1974 | Smith | 264/328.7 |
| 3,960,996 | 6/1976 | Balevski et al. | 264/45.5 |
| 4,014,966 | 3/1977 | Hanning | 264/45.1 |
| 4,092,385 | 5/1978 | Balevski et al. | 264/45.5 |
| 4,106,887 | 8/1978 | Yasuike et al. | 264/45.5 |
| 4,124,308 | 11/1978 | Sokolow | |
| 4,133,858 | 1/1979 | Hayakawa et al. | 264/328.7 |
| 4,140,672 | 2/1979 | Kataoka | 425/817 R |
| 4,155,969 | 5/1979 | Hendry | 264/45.1 |
| 4,206,165 | 6/1980 | Dukess | 428/71 |
| 4,208,368 | 6/1980 | Egli | 264/40.3 |
| 4,542,054 | 9/1985 | Fillmann | 428/71 |
| 4,783,292 | 11/1988 | Rogers | 264/328.7 |
| 5,028,377 | 7/1991 | Hendry | 264/328.7 |

FOREIGN PATENT DOCUMENTS

| | | |
|---|---|---|
| 2256021 | 7/1975 | France . |
| 50-17476 | 2/1975 | Japan . |
| 51-68675 | 6/1976 | Japan . |
| 57-14968 | 3/1982 | Japan . |
| 58-3815 | 1/1983 | Japan . |
| 58-14295 | 3/1983 | Japan . |
| 59-2822 | 1/1984 | Japan . |
| 2132932 | 7/1984 | United Kingdom . |

OTHER PUBLICATIONS

Machine Design, vol. 44, No. 6, 29 Jun. 1972, pp. 69–71, Ogorkiewicz R. M. "Sandwich Molding".

*Primary Examiner*—Allan R. Kuhns

[57] ABSTRACT

A shaped article of resin disclosed which possesses a two-ply construction wherein the outer side of a core-layer resin foamed at a void ratio in the range of from 30 to 80% is wrapped with a skin-layer resin. This shaped article of resin is produced by a method which comprises injecting a skin-layer resin into a molding mold and subsequently or simultaneously injecting therein a core-layer resin foamed in advance in a molding device.

8 Claims, 4 Drawing Sheets

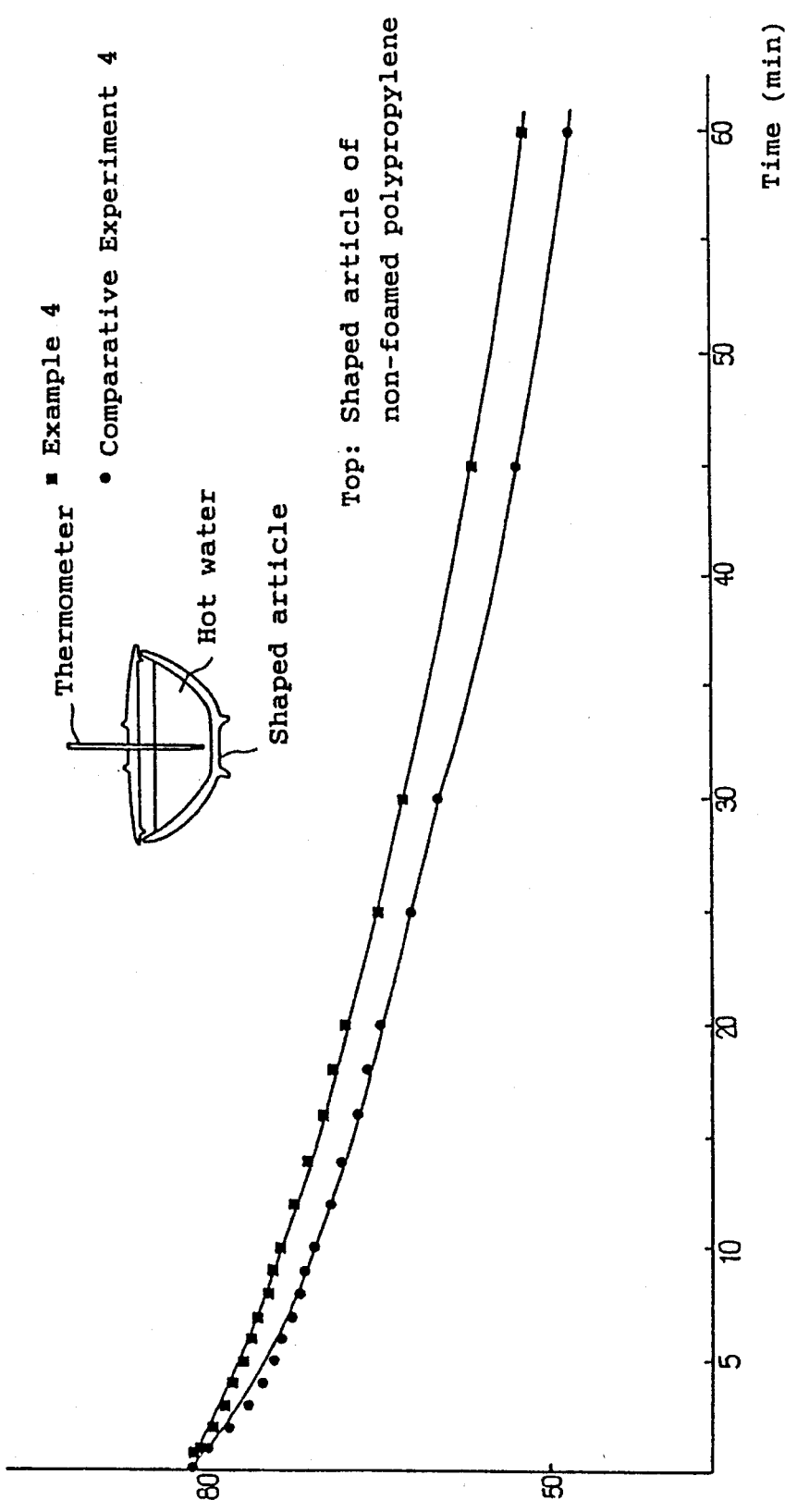

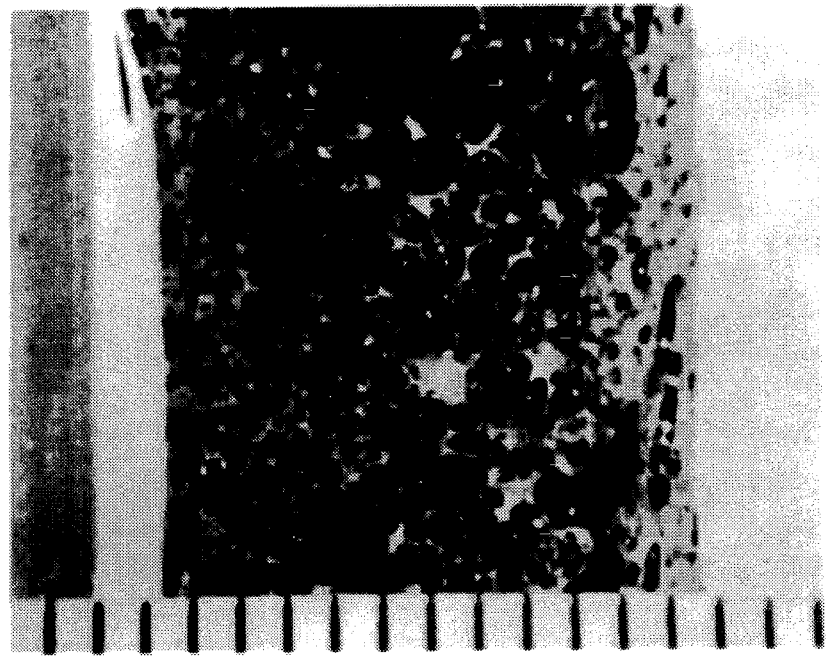
One division: 0.5mm
F I G. 3a
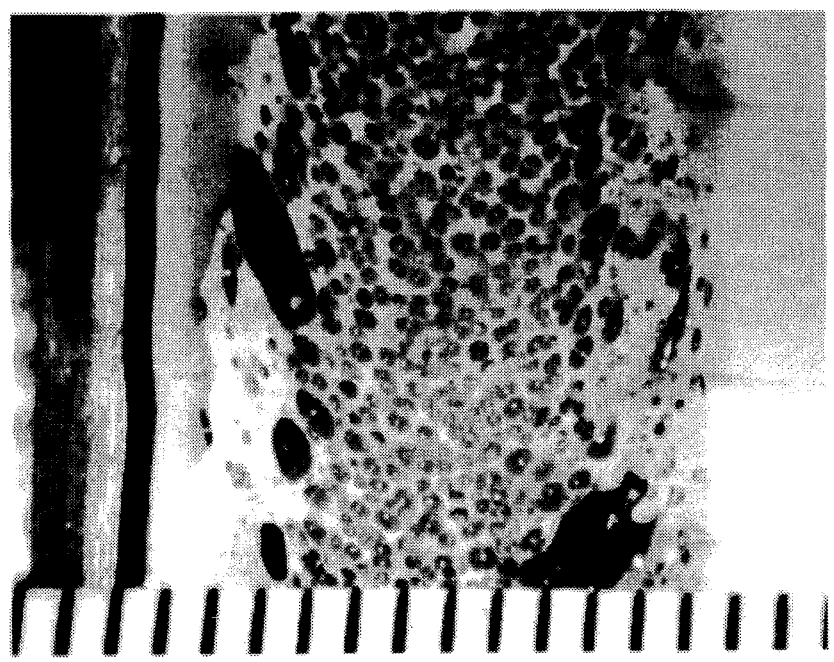
One division: 0.5mm
F I G. 3b

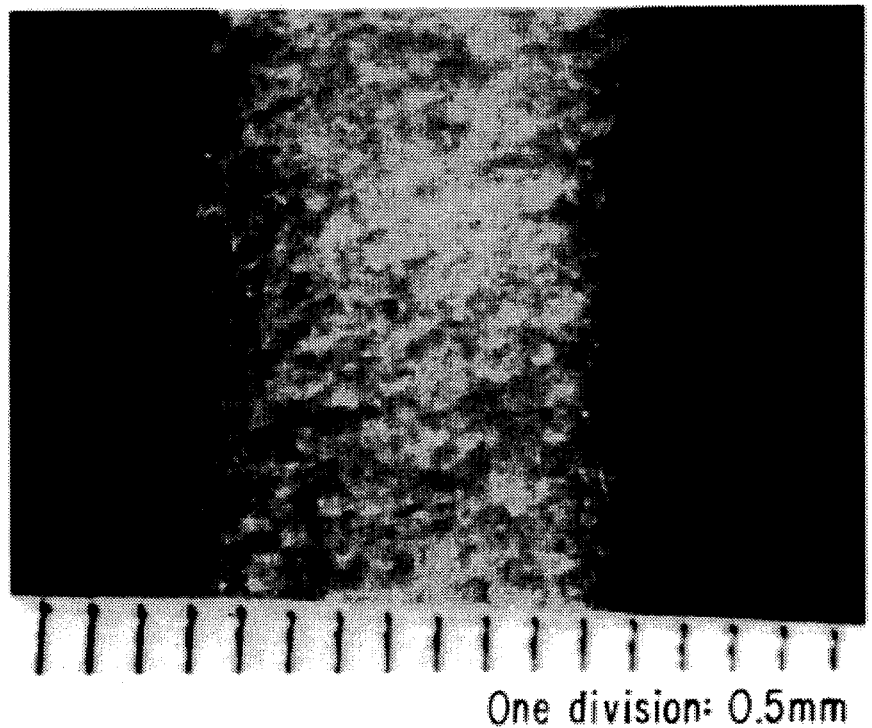
One division: 0.5mm
F I G. 4a
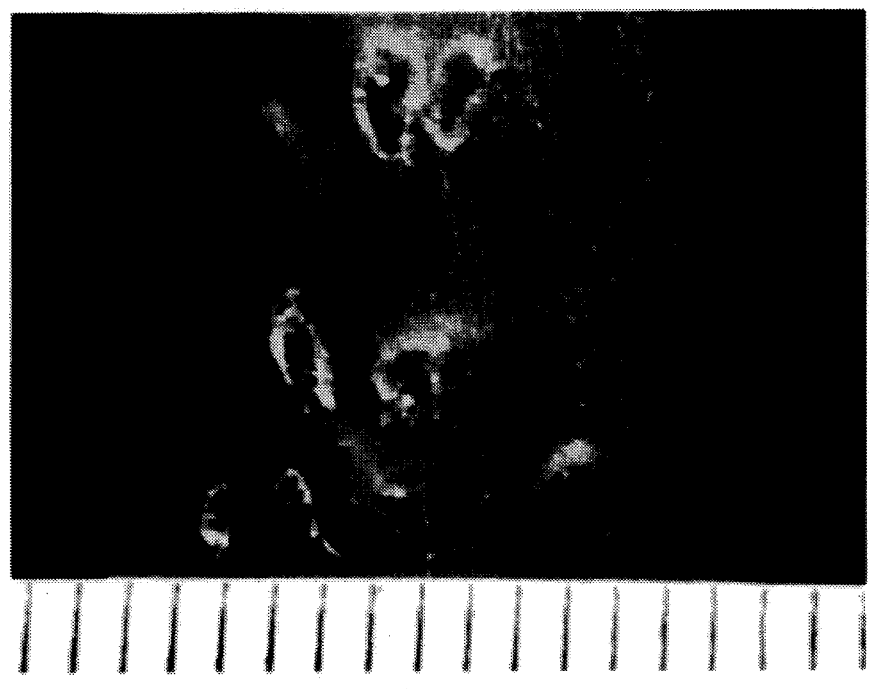
One division: 0.5mm
F I G. 4b

METHOD OF FORMING A SHAPED ARTICLE OF RESIN USING CAVITY ENLARGEMENT TO INDUCE FOAMING

This application is a continuation of application Ser. No. 07/838,256 filed as PCT/JP90/01661 on Dec. 20, 1990, now abandoned.

BACKGROUND OF THE INVENTION

1. Field of the Invention

This invention relates to shaped articles of resin for use in various household utensils and a method for the production thereof.

2. Description of the Related Arts

In recent years, the development of resins possessing a great variety of characteristic properties has come to encourage the resins to find extensive utility in household utensils represented by household electric appliances and fixtures. Particularly, the utilization of the thermal and electrical insulating properties of these resins in articles of tableware and housings for household electric appliances has been the subject of various studies for development.

For the production of shaped articles of such resins, the method which comprises filling the cavity of a mold consisting of a male segment and a female segment with a thermally melted resin, allowing the molten resin to cool and solidify in the cavity, and thereafter removing a shaped article of resin from the mold has been generally adopted. When a shaped article of resin having a large wall is produced by this method, however, the product is heavy because of high density and liable to sustain strain in the form of so-called sink marks and warps because of shrinkage of resin.

For the solution of this problem, there have been several proposals. For example, (1) the so-called gas counter pressure method which comprises injecting a resin having incorporated therein a foaming agent into a pressurized cavity of a mold, thereafter decompressing the interior of the cavity, and foaming the resin inside the cavity as disclosed in U.S. Pat. No. 3,960,996; (2) the so-called sandwich molding method which comprises injecting a skin-layer resin containing no foaming agent, then injecting a core-layer resin incorporating therein a foaming agent, and foaming exclusively the core-layer resin; (3) a method which as disclosed in Japanese Patent Application Laid-open SHO 50(1975)-17476 comprises preliminarily keeping the interior of a cavity under pressure with compressed air, filling the cavity with a skin-layer resin and a core-layer resin both of a foaming formula by the use of an injection molding device of a desired mechanism, relieving the cavity interior of the pressure after the cavity has been filled to capacity with the resins, and foaming the skin layer and the core layer simultaneously while imparting a smooth surface to the skin layer; (4) and the method which comprises injecting a resin into the cavity of a mold and thereafter injecting a highly compressed gas into the mass of resin thereby obtaining a hollow shaped article as disclosed in Japanese Patent Publication SHO 57(1982)-14,968.

The shaped article obtained by the sandwich molding method, which foams exclusively the core-layer resin sustains strain only sparingly because the shrinkage of the skin-layer resin is internally repressed by the pressure arising from the foaming of the core layer. Hence the shaped article assumes a smooth surface excellent in rigidity and impact strength because the skin-layer resin is not foamed.

These methods have their own merits and demerits. Moreover, there has been expressed in the industry a desire to develop shaped articles of light weight. Presently, the desirability of perfecting a method for producing shaped articles enjoying ample strength, light weight, and good appearance has been finding enthusiastic recongnition.

SUMMARY OF THE INVENTION

This invention concerns shaped articles of resin free from the problem described above and a method for the production thereof.

The first aspect of this invention concerns a shaped article of resin possessing a two-ply construction having the outer side of a core-layer resin wrapped with a skin-layer resin, which shaped article is characterized in that at least the core layer is made of a resin foamed at a void ratio of from 30 to 80%. The second aspect of this invention concerns a method for the production of a shaped article of resin possessing a two-ply construction having the outer side of a core-layer resin wrapped with a skin-layer resin, which method is characterized by the steps of injecting a skin-layer resin into the cavity of a mold and subsequently or simultaneously injecting a core-layer resin foamed by incorporation of a foaming agent therein.

BRIEF DESCRIPTION OF THE DRAWINGS

FIG. 2 is a diagram comparing the product of Example 4 of this invention with the product of Comparative Experiment 4 in terms of the ability to retain elevated temperature.

FIG. 3A and 3B are photographs showing the cross sections respectively of the shaped article of Example 2 and the shaped article of Comparative Experiment 3.

FIG. 4A and 4B are photographs showing the cross sections respectively of the shaped articles of Example 4 of this invention and the shaped article of Comparative Experiment 4.

DETAILED DESCRIPTION OF THE PRESENT INVENTION

Figure 1:
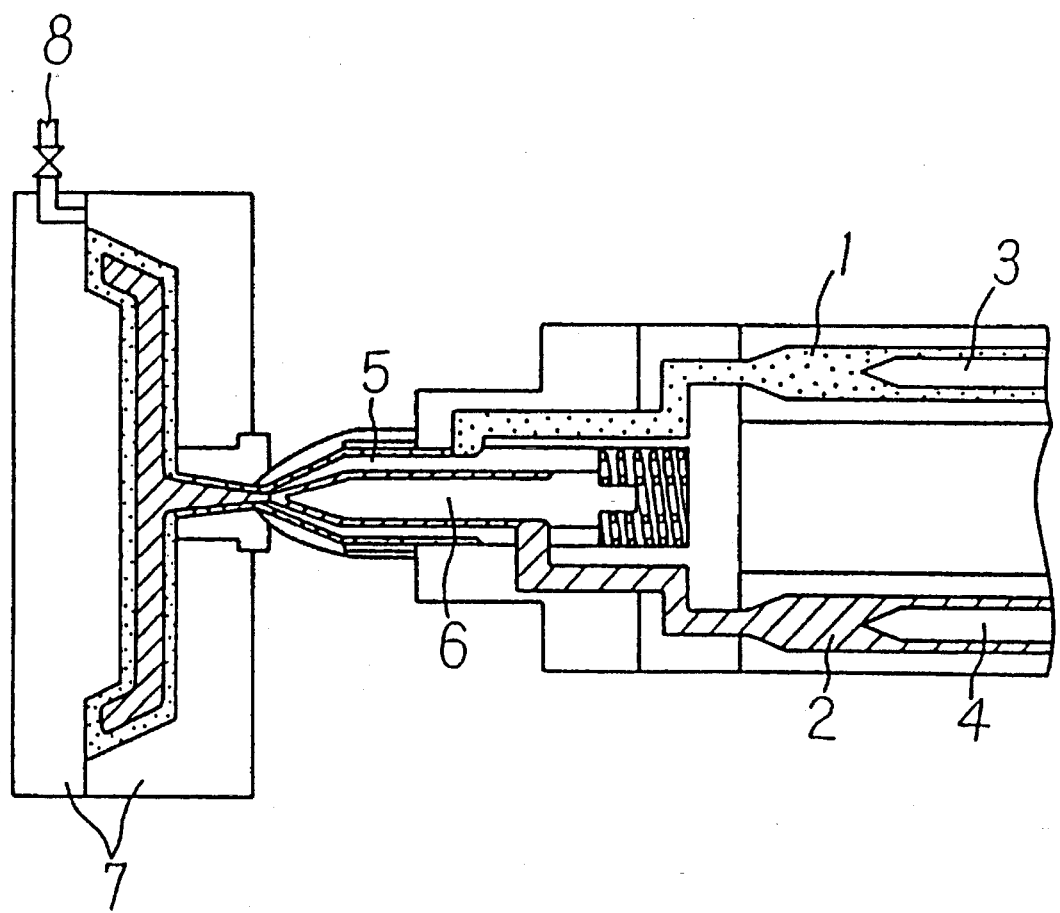
FIG. 1 is a cross section illustrating schematically a molding apparatus for executing the method of production of the present invention.

The shaped article of resin contemplated by the present invention possesses a two-ply construction consisiting of a core layer and a skin layer. The core layer and the skin layer may be made of one same resin or two different resins to suit the purpose for which the shaped product is to be used. While the core-layer resin is necessarily foamed by the incorporation of a foaming agent, the skin-layer resin may be foamed, when necessary, by the incorporation of a foaming agent. When the skin-layer resin is foamed, the extent of foaming must be controlled so as to prevent the foaming from impairing the smoothness of the surface of the shaped article or degrading the strength of the shaped article.

Optionally, the foaming may be carried out by the use of a mold kept in a state pressed with a compressed gas as disclosed in Japanese Patent Application SHO 50(1975)-17,476 or by the adoption of a method using a mold capable of enlarging the die cavity after preliminary injection of resin as disclosed in Japanese Patent Publication SHO 39(1964)-22,213.

The resins to be used for forming the skin layer and the core layer in the shaped article of resin as contemplated by this invention may be identical or not identical with each other in kind, in color, or in other quality.

The resins which are effectively usable herein have no particular restriction except for the sole requirement that they should be capable of being injection molded.

The resins thus usable include crystalline resins such as polyethylene, polypropylene, polyacetal, and nylon and amorphous resins such as polystyrene, styrene-butadiene copolymer, ABS resin, SAN resin, polyvinyl chloride, polymethyl methacrylic esters, polyphenylene ether, and polycarbonate, for example. It is permissible to use a combination of two or more members suitably selected from among the resins enuemrated above from the standpoint of economy and good appearance.

The foaming condition of the core layer varies with the particular kind of resin to be used for the core layer. The foamed core layer may be either in the form of cotton made up of intertwined fibers of resin or in the form of pumice having countless through holes distributed in a resin layer. The form of cotton results from using polypropylene (crystalline thermoplastic resin) and the form of pumice from using impact-proof polystyrene (amorphous thermoplastic resin).

The foaming agent to be incorporated in the resin is not required to be of a special quality. Any of the organic and inorganic foaming agents heretofore available in the market may be used. The foaming agents which answer this description include such foaming agents as pentane and heptane which possess boiling points in the range of from 20° C. to 80° C. under normal pressure, exhibit high critical temperatures, and undergo compaction under pressure at their inherent foaming temperatures as well as chemical foaming agents such as azodicarbonamide (ADCA), sodium bicarbonate, and sodium citrate which emit incondensible nitrogen and carbon dioxide gasses at their inherent foaming temperatures.

In the shaped article of resin contemplated by this invention, the core layer has a void ratio in the range of from 30 to 80%, desirably from 40 to 80%, and more desirably from 50 to 80%, If this void ratio is less than 30%, the core-layer resin possesses a high density and the shaped article suffers from an increase in weight. If the void ratio exceeds 80%, there arises the disadvantage that the shaped article suffers from a decline in impact strength.

Now, the method for producing the shaped article of resin contemplated by this invention will be described below with reference to the accompanying drawings.

FIG. 1 is a diagram illustrating one example of the apparatus for working the method of production according to this invention. In FIG. 1, 1 stands for a skin-layer resin, 2 for a core-layer resin, 3 for a skin-layer screw, 4 for a core-layer screw, 5 for a skin-layer needle, and 6 for a core-layer needle. The skin-layer resin 1 and the core-layer resin 2 are extruded forward (toward the left in the bearings shown in the diagram) respectively by the skin-layer screw 3 and the core-layer screw 4. The injection outlet is kept closed by the skin-layer needle 5 and the core-layer needle 6 while the injection is not in process. The pressures exerted by the screws urge the skin-layer resin 1 and the core-layer resin 2 and consequently repel the respective needles and finally lead the resins to the injection outlet. The resins are injected into the cavity of a mold 7 by the pressures of the screws.

The method of production in accordance with this invention is characterized by causing the foaming of the resins which has been heretofore effected after the injection of the resins into the cavity to be carried out before the resins are injected. To be specific, the production is accomplished by filling the apparatus constructed as illustrated in FIG. 1 with the core-layer resin 2, then retracting the core-layer screw 4 thereby decreasing the pressure acting upon the core-layer resin 2, foaming the core-layer resin subsequently advancing the core-layer screw 4, and injecting the core-layer resin 2 thereby forming a fully foamed core layer.

In the shaped article of resin of this invention, the core layer is uniformly foamed to the terminal parts. At the cooling step in the process of molding, therefore, the cells in the core layer uniformly act on the entire volume of the shaped article functions to repress the otherwise possible shrinkage of the resin. As a result, the shaped product does not easily sustain sink marks or warps, acquires a uniform texture throughout the entire volume thereof, and enjoys perfect uniformity in rigidity and impact strength. Moreover, the shaped article of this invention has a conspicuously light weight because the core layer is foamed at a large extent as compared with the conventional shaped article of the sandwich molding. The foamed part of the core layer is in the form of cotton or pumice and, therefore, is rich in the thermal insulating property because the flow of air inside the foamed core layer is notably limited.

Since the method of production of this invention causes the core layer to be formed of a prefoamed resin in the molding device, it does not experience the protrusion of the core-layer resin through the part close to the terminal of the flow of resin inside the cavity as involved in the conventional sandwich molding method using a foaming resin in the core layer. It allows insertion of the uniformly foamed resin into the shaped article throughout the entire volume thereof. Further, the ratio of foaming of the resin can be controlled easily by varying the kind and amount of the foaming agent to be used.

Now, specific working examples of this invention will be cited below. It should be noted that the present invention is not limited to these working examples.

Wherever the term "parts" is mentioned in the working examples, it invariably means "parts by weight".

The void ratio of the core layer was calculated in accordance with the following formula.

(Core layer volume of shaped article–Core-layer resin volume of shaped article)/(Core-layer volume of shaped article)

EXAMPLE 1

In an apparatus constructed as illustrated in FIG. 1, a shaped article of resin was produced by the use of a mold possessing a disclike cavity 12 mm in thickness and 214 cm$^3$ in volume.

A high-impact polystyrene was used for both a core-layer resin and a skin-layer resin. To the core-layer resin, 0.72 part of ADCA was added as a foaming agent per 100 parts of the core-layer resin. 45 g of the core-layer resin was kept under sufficient back pressure to retain its non-foamed state and, at the same time, melted in conjunction with 100 g of the skin-layer resin at a temperature of 220° C. The two layer resins so melted were placed severally in the molding device. Thereafter, the core-layer screw was retracted until the inner space proceding it reached 2.4 times the volume of the core-layer resin held in the cavity to lower the pressure exerted on the core-layer resin and set the core-layer resin foaming. Then, the foamed core-layer resin and the skin-layer resin were simultaneously injected into the molding cavity. The shaped article obtained after the subsequent cooling weighed 145 g and showed a ratio of foaming of 151% and the core layer showed a void ratio of 65%. This product was light and free from sink marks and warps snd suffered from no protrusion of the core layer.

EXAMPLE 2

A shaped article was obtained by following the procedure of Example 1, excepting a mold possessing a disclike cavity 9 mm in thickness and 160 $cm^3$ in inner volume was used, 80 g of a skin-layer resin and 34 g of a core-layer resin having 0.36 part, based on 100 parts by weight of the core-layer resin, of ADCA incorporated therein as a foaming agent were placed under application of back pressure into the apparatus, and thereafter the screw was retracted until the inner space preceding it reached 1.7 times the volume of the core-layer resin placed therein.

The shaped article weighed 114 g and showed a ratio of foaming of 145% and the core layer showed a void ratio of 57%. The product was light and excellent in appearance. The core layer had the form of pumice. The cross-section of this shaped article is shown in FIG. 3 (a).

EXAMPLE 3

A shaped article was obtained by faithfully repeating the procedure of Example 1, excepting 90 g of a skin-layer resin having 0.18 part, based on 100 parts of the skin-layer resin, of a foaming agent incorporated therein and a molding mold pressed in advance to 8 kg/$cm^2$ with a gas were used instead and, after the cavity was filled with the two resins, the molding was carried out by relieving the interior of the cavity of the gas pressure.

The shaped article was light and showed a ratio of foaming of 164%. Similarly to the product of Example 1, the product in this case sustained neither sink mark nor warp and enjoyed an excellent appearance.

COMPARATIVE EXPERIMENT 1

A high-impact polystyrene containing no foaming agent was used for both a skin layer and a core layer. The amount of the core-layer resin placed in the apparatus was equal to the volume produced by the retraction of the cross-layer screw in Example 1, namely, the volume which existed between the time the screw was fully retracted and the time the injection was about to start. The core-layer resin was placed in a thermally melted state and skin-layer resin was similarly placed in the apparatus. Thereafter, the two resins were injected into the same molding cavity as used in Example 1. The shaped article obtained after the subsequent cooling step weighed 220 g and showed sink marks conspicuously.

COMPARATIVE EXPERIMENT 2

A shaped article was obtained by following the procedure of Example 2, excepting the core-layer resin containing the foaming agent, during the introduction thereof into the apparatus, was kept under back pressure enough for the retention of its unfoamed state inside the apparatus and the inner space formed by the retraction of the core-layer screw in Example 2 was filled with the thermally melted resin.

The shaped article was free from sink mark and warp. It weighed 131 g and showed a ratio of foaming of 120%. It suffered from protrusion of the core-layer resin and assumed a poor appearance.

CCOMPARATIVE EXPERIMENT 3

A shaped article was obtained by faithfully repeating the procedure of Example 2, excepting the retraction of the core-layer screw was omitted.

This shaped article showed a ratio of foaming of 130%. It suffered from protrusion of the core-layer resin and sustained large sink marks. The cross section of this shaped article is shown in FIG. 3 (b).

EXAMPLE 4

By the use of a cavity of the mold for a polypropylene cup of 142 g, 72 g of a skin-layer resin and 32 g of a core-layer resin both made of polypropylene and the core-layer resin additionally incorporating therein 0.5 part of ADCA as a foaming agent per 100 parts of the core-layer resin were prepared as a molding material and thermally melted in an apparatus constructed as illustrated in FIG. 1 with the core-layer resin kept under back pressure enough for keeping the core-layer resin in its unfoamed state and consequently allowed to fill the apparatus. After the filling, the core-layer screw was retracted until the inner space preceding it reached 1.7 times the volume of the core-layer resin held in the cavity and the core-layer resin and the skin-layer resin were simultaneously injected into the molding cavity. The shaped article obtained after the subsequent cooling step weighed 104 g and showed a ratio of foaming of 136% and the core layer showed a void ratio of 54%. This product exhibited a highly satisfactory ability to retain an elevated temperature. The cross section of this product is shown in FIG. 4 (a).

COMPARATIVE EXPERIMENT 4

A shaped article was obtained by faithfully repeating the procedure of Example 4, excepting the retraction of the core-layer screw was omitted.

The shaped article showed a ratio of foaming of 120% and sustained many sink marks. It was slightly inferior in the ability to retain an elevated temperature to the shaped article of Example 4. The cross section of this shaped article is shown in FIG. 4 (b).

FIG. 2 shows the results of the comparison of the shaped srticles obtained in Example 4 and Comparative Experiment 4 in terms of the thermal insulating property.

As described above the shaped article of resin and the method for the production thereof according with this invention have the following effects.

① The shaped articles of this invention sustain neither sink mark nor warp and enjoy good appearance.

② They are light.

③ They are advantageous in terms of cost because they have a sandwich molding inclusive of a core layer which may be made of reclaimed resin.

④ Since they can be produced by the conventional apparatus designed for the production of shaped articles of a sandwich molding, their production does not require any alteration in the existing apparatus.

⑤ Since the extent of foaming can be easily controlled, the characteristic properties of shaped articles to be produced can be easily varied.

⑥ They excel in the ability to retain elevated temperatures.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for producing a shaped resin article, which comprises:

filling a first storage cavity having an inner volume with a molten core-layer resin which contains a foaming agent while applying pressure to a screw in the first storage cavity in such a manner as not to foam said molten core-layer resin, filling a second storage cavity with a molten skin-layer resin which does not contain a foaming agent, increasing the inner volume of the first storage cavity by retracting the screw of the first storage cavity to reduce the pressure exerted on the core-layer resin, thereby foaming said core-layer resin within the first storage cavity, and injecting the skin-layer resin from the second storage cavity and subsequently or simultaneously therewith injecting the foamed core-layer resin from the first storage cavity into a molding cavity to thereby form a shaped resin article.

2. The method according to claim 1, wherein said core-layer resin is foamed sufficiently by the increasing of the inner volume of the first storage cavity that the core-layer of the shaped resin article has a void ratio in the range of from 50 to 80%.

3. The method according to claim 1, wherein said foaming agent is selected from the group consisting of pentane, heptane, azodicarbonamide, sodium bicarbonate, and sodium citrate.

4. The method according to claim 1, wherein said skin-layer resin is injected into said molding cavity simultaneously with said core-layer resin.

5. A method for producing a shaped resin article, which comprises:

filling a first storage cavity having an inner volume with a molten core-layer resin which contains a foaming agent while applying pressure to a screw in the first storage cavity in such a manner as not to foam said molten core-layer resin, filling a second storage cavity with a molten skin-layer resin which contains a foaming agent, increasing the inner volume of the first storage cavity by retracting the screw of the first storage cavity to reduce the pressure exerted on the core-layer resin, thereby foaming said core-layer resin within the first storage cavity, injecting the skin-layer resin from the second storage cavity and subsequently or simultaneously therewith injecting the foamed core-layer resin from the first storage cavity into a gas pressurized molding cavity, and releasing the gas pressure from said molding cavity after injecting the skin-layer resin and the core-layer resin into the molding cavity to thereby form a shaped resin article.

6. The method according to claim 5, wherein said core-layer resin is foamed sufficiently by the increasing of the inner volume of the first storage cavity that the core-layer of the shaped resin article has a void ratio in the range of from 50 to 80%.

7. The method according to claim 5, wherein said foaming agent is selected from the group consisting of pentane, heptane, azodicarbonamide, sodium bicarbonate, and sodium citrate.

8. The method according to claim 5, wherein said skin-layer resin is injected into said molding cavity simultaneously with said core-layer resin.

* * * * *

UNITED STATES PATENT AND TRADEMARK OFFICE
CERTIFICATE OF CORRECTION

PATENT NO. : 5,474,723
DATED : Dec. 12, 1995
INVENTOR(S) : Horikoshi

It is certified that error appears in the above-indentified patent and that said Letters Patent is hereby corrected as shown below:

On title page, insert the following:

--[73] Assignee: Asahi Kasei Kogyo Kabushiki Kaisha, Osaka, Japan--.

Signed and Sealed this

Twenty-first Day of May, 1996

*Attest:*

BRUCE LEHMAN

*Attesting Officer*  *Commissioner of Patents and Trademarks*